March 29, 1960
W. SEBARDT
2,930,574
VALVE OF THROTTLE TYPE
Filed Nov. 29, 1954
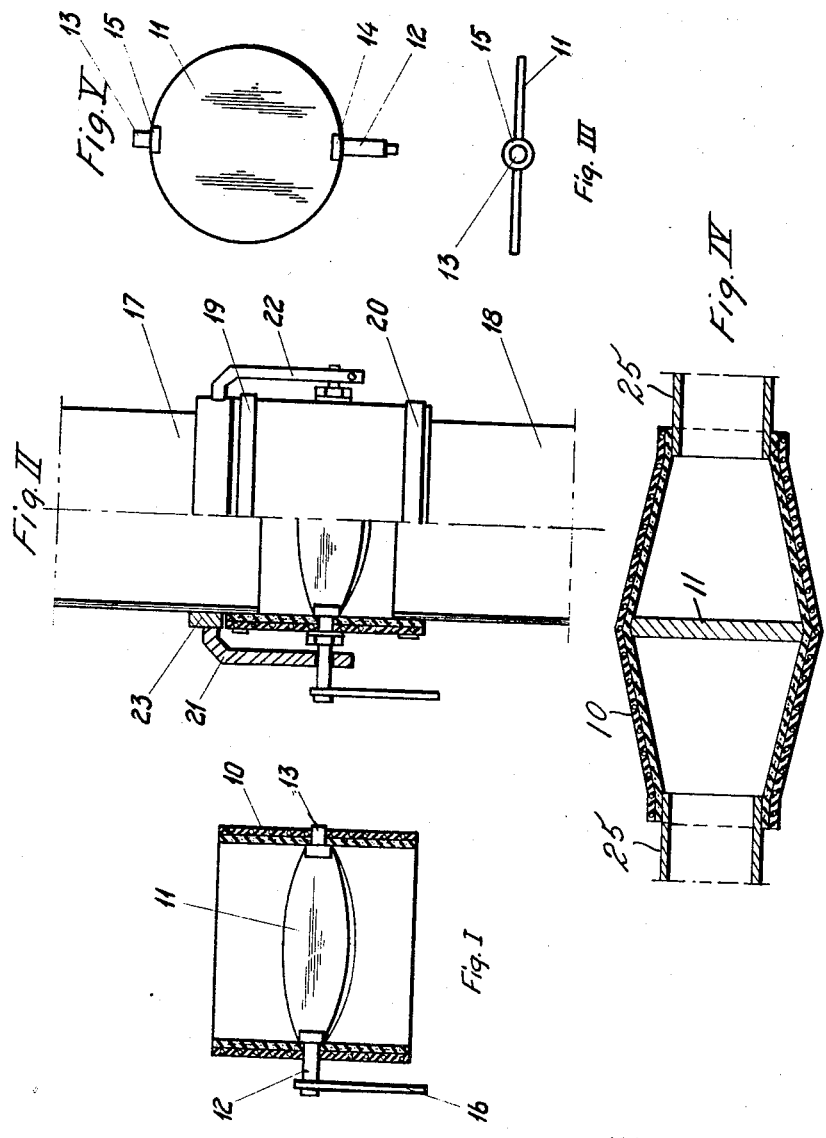
INVENTOR
WILHELM SEBARDT,
BY Robert B Larson
ATTORNEY United States Patent Office 2,930,574
Patented Mar. 29, 1960

2,930,574
VALVE OF THROTTLE TYPE

Wilhelm Sebardt, Bromma, Sweden, assignor to International Ytong-Stabalite Company Ltd., London, England, a corporation of Great Britain Application November 29, 1954, Serial No. 471,837

2 Claims. (Cl. 251—170)

The instant invention relates to throttle valves.

Valves commonly comprise a casing or housing, ordinarily of tubular cross-section, and a valve member mounted within the casing or housing. The valve member is so mounted as to be turnable within the cross-section of the tubular casing. Moreover, valves are commonly characterized by the means employed to effect tight, sealing engagement between the valve member and its casing. Primarily consideration is given here to the intended range of use for the valve. For example, a valve intended only as a check valve does not require any high degree of sealing engagement between the valve member and its casing. On the other hand, a throttle valve intended for usage in conveying gases, liquid, pasty, or powdered media must have a valve member which cooperates with its casing to provide tight, sealing engagement therewith in the closure position. For this purpose, various forms of valve seatings within the tubular casing have been proposed. Certain disadvantages have been attendant upon the usage of such seatings. As an example, where hard lumps are entrained within a liquid medium under conveyance, the lumps often fasten to the tube seatings and prevent full closure of the throttle valve. A further disadvantage resides in the use of seatings which tightly surround the valve member and due to their inability to flex outwardly prevent altogether free movement of the valve member. To meet these disadvantages, it has been proposed to furnish the valve member with a gasket surrounding its periphery. Again, however, certain shortcomings have been evident.

An object of the instant invention is the provision of a valve which is free of these disadvantages. Another object of the invention is the provision of such a valve having simple construction and capable of bearing large stresses without appreciable damage thereto.

According to the instant invention, a throttle valve is disclosed consisting of a disk-shaped valve member having a smooth-curved periphery, and elastic tubing defining the flow path within which the valve member is mounted. The elastic tubing has a smaller inner circumference than the disk-shaped valve member yet surrounds the valve member by virtue of its elasticity. On the valve member is a pair of diametrically opposed rod-shaped projections employed to rotatably mount the valve within the tubing, through sealing engagement with diametrically opposed holes in the tubing. This sealing engagement is achieved through the fact that the projections have a greater diameter than the holes. At least one of the projections extends beyond and outside the tubing and means are mounted on it for rotating the valve member within the tubing.

The invention will be better illustrated by reference to the attached drawing wherein:

Fig. 1 illustrates the valve in its simplest form with a cross-sectional view;

Fig. 2 illustrates an embodiment of the invention wherein the valve is adapted to mechanical operation through an appropriate linkage, again by cross-sectional view;

Fig. 3 illustrates the valve member itself in horizontal projection;

Fig. 4 schematically illustrates the valve in closed position;

Fig. 5 illustrates the valve member of Fig. 3 in vertical projection.

With reference to Fig. 1, the throttle valve of the invention can be seen in its simplest form. The valve consists of a casing 10 within which valve member 11 is rotatably mounted by rod-shaped projections 12 and 13 secured thereon in diametrically opposing relationship. The projections extend through diametrically opposed holes in casing 10. At least one of the projections 12 can be seen to extend beyond and outside of the casing 10, where means such as handle 16 is attached for turning or rotating the valve member 11 within the tubular casing 10.

The casing 10 defines the flow path for the medium under conveyance, and can be constructed of any suitable elastic material, such as rubber or plastic material. Preferentially, the casing 10 is manufactured so as to have an internal layer of soft rubber and an external layer of reinforced rubber. Accordingly, the edge of the valve member 11 can depress the region of soft rubber with which it is in immediate engagement, so as to acquire greater sealing contact with the casing 10. A further advantage in having an internal layer of soft rubber in the makeup of the tubular casing cross-section is attained when granular material is under conveyance through the casing 10 and grains thereof become lodged between the edge of the valve member 11 and the internal engaging surface of the casing 10. The grains can remain temporarily lodged in the soft material of the internal layer without reducing the closure capacity of the valve. The reinforced outer layer of rubber material provides the strength necessary within the casing wall to withstand the inherent pressure stresses. The two layers, of course, constitute the casing wall and are preferably joined by vulcanization.

The valve member 11 can be made of metallic material, or to avoid corrosive wear of the member, it can be made of rubberized or ceramic material. It can also be manufactured of plastic or like material.

With reference to Figs. 3 and 5, the valve member 11 can be seen in horizontal and vertical projection. The disk-shaped member can be made of circular or elliptical cross-section. The member should have a convex external silhouette. The disk-shaped member will be seen to have two diametrically opposed pivots or rod-shaped projections 12 and 13 secured thereon. Moreover, the pivots 12 and 13 are provided with flanges 14 and 15, respectively, at the points at which they join the disk-shaped member 11.

The disk-shaped valve member has a circumference which is larger than the internal circumference of the elastic casing 10. It has been found that the circumference of the valve member 11 should exceed the internal circumference of the elastic casing 10 by 2–10% where a reinforced casing is employed. If an unreinforced casing is used, this difference can be substantially increased, of course.

Furthermore, the pivots 12 and 13 have a diameter greater than the diameter of the holes in the casing 10.

Fig. 4 illustrates schematically the throttle valve of the invention in closure position. The elastic casing 10 will be seen to be mounted at its ends on piping 25. Within the casing 10 is valve member 11 in closure position. Due to the fact that the valve member 11 has a larger circumference than the tubular casing 10, the side walls of the casing will be stretched and will not form a straight line between the casing ends. With stretching of the elastic casing stresses will be formed within the casing, which are transmitted as contact stresses between the valve member and the casing. From this it will be evident that the sealing engagement will be enhanced since the casing ends are drawn apart by the force of their fixture with piping 25. Helical stress springs may in practice be applied to the casing ends, outside and parallel to the cross-secton of the tubular casing.

The edge of the valve member should be bevelled so as to provide for the least amount of wear over the contact surface and to permit free opening and closing movement.

Due to the greater diameter of the projections 12 and 13, their engagement with the holes in the tubular casing again furnishes a sealed closure.

If necessary to provide additional reinforcement about the casing wall, metal bands or elastic springs can be placed about the casing downstream or upstream of the valve member.

In the embodiment described the pivots have been supported directly in the elastic casing. If a valve to be operated remotely through appropriate mechanical linkage is desired, the embodiment shown in Fig. 2 can be employed. In this figure the valve is mounted on two tubes 17 and 18 with two clamping bands 19 and 20. To obtain greater stability in the valve arrangement, the pivots of the valve member are fixed, in addition to being supported directly in the elastic casing, in two supporting bars 21 and 22 which, as shown in Fig. 2, are fixed in a ring 23 fastened to a tube 17.

The valve member is installed in the casing by deforming the casing radially so that the valve disk may be inserted until the projections engage with the tubing holes.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A throttle valve consisting of a disk-shaped valve having a smooth-curved periphery, and elastic tubing defining the flow path and having a smaller inner circumference than, yet surrounding said disk-shaped valve by virtue of said elasticity, said disk-shaped valve having a pair of diametrically opposed rod-shaped projections rotatably mounting said valve in said tubing, said projections having a greater diameter than, and in sealing engagement with diametrically opposed holes in said elastic tubing.

2. A throttle valve according to claim 1 wherein at least one of said rod-shaped projections extends beyond and outside said tubing, and having means attached to said projection with which to rotate said disk-shaped valve within said elastic tubing.

References Cited in the file of this patent

UNITED STATES PATENTS

| | | |
|---|---|---|
| 859,139 | Spencer | July 2, 1907 |
| 1,230,007 | Millikan | June 12, 1917 |
| 1,858,470 | Sloan | May 17, 1932 |
| 1,977,351 | Phillips | Oct. 16, 1934 |
| 2,147,124 | Litle | Feb. 14, 1939 |
| 2,299,865 | Whitted | Oct. 27, 1942 |
| 2,467,150 | Nordell | Apr. 12, 1949 |
| 2,789,785 | Woods | Apr. 23, 1957 |

FOREIGN PATENTS

| | | |
|---|---|---|
| 536,993 | Great Britain | of 1941 |